United States Patent
Matsui et al.

(10) Patent No.: US 8,753,249 B2
(45) Date of Patent: Jun. 17, 2014

(54) CONTROL APPARATUS FOR AUTOMATIC TRANSMISSION MECHANISM

(71) Applicant: Honda Motor Co., Ltd., Tokyo (JP)

(72) Inventors: Ryo Matsui, Wako (JP); Toshikazu Uneyama, Wako (JP); Akihiro Shibahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/113,969

(22) PCT Filed: Jan. 21, 2013

(86) PCT No.: PCT/JP2013/051096
§ 371 (c)(1),
(2), (4) Date: Oct. 25, 2013

(87) PCT Pub. No.: WO2013/140841
PCT Pub. Date: Sep. 26, 2013

(65) Prior Publication Data
US 2014/0050601 A1 Feb. 20, 2014

(30) Foreign Application Priority Data
Mar. 21, 2012 (JP) .................. 2012-063594

(51) Int. Cl.
*F16H 61/662* (2006.01)
(52) U.S. Cl.
USPC .......................................................... 477/45
(58) Field of Classification Search
None
See application file for complete search history.

(56) References Cited

U.S. PATENT DOCUMENTS 5,813,933 A * 9/1998 Tsukamoto et al. ............ 474/11
8,002,653 B2 * 8/2011 Shiozaki et al. .................. 474/8

FOREIGN PATENT DOCUMENTS

JP 2010-078021 A 4/2010
JP 2011-196390 A 10/2011

OTHER PUBLICATIONS

International Search Report dated Apr. 2, 2013 corresponding to International Patent Application No. PCT/JP2013/051096 and English translation thereof.

* cited by examiner

*Primary Examiner* — Erin D Bishop
(74) *Attorney, Agent, or Firm* — Squire Sanders (US) LLP

(57) ABSTRACT

A control apparatus for an automatic transmission mechanism including a continuously variable transmission having a drive pulley, a driven pulley, and a belt extending around the two pulleys. When beginning of the start of a drive source for driving a vehicle has been detected, a first command oil pressure as a command value of a first control oil pressure supplied to a cylinder chamber of the drive pulley is set to a first predetermined oil pressure substantially equal to 0, and a second command oil pressure as a command value of a second control pressure supplied to a cylinder chamber of the driven pulley is set to a second predetermined oil pressure higher than the first predetermined oil pressure. When the detected second control oil pressure has reached a predetermined threshold value, it is determined that filling of the cylinder chamber of the driven pulley has been completed. A control for increasing the first command oil pressure is performed from a time point when completion of the filling of the cylinder chamber of the driven pulley has been determined.

12 Claims, 4 Drawing Sheets

CONTROL APPARATUS FOR AUTOMATIC TRANSMISSION MECHANISM

TECHNICAL FIELD

The present invention relates to a control apparatus for an automatic transmission mechanism, which is provided with a belt-type continuously variable transmission and an oil pressure control device for controlling the continuously variable transmission.

BACKGROUND ART

Patent Document 1 (shown below) discloses an oil pressure control device for controlling a continuously variable transmission that includes a drive pulley, a driven pulley, and a belt wound around the two pulleys. The oil pressure control device controls belt pinching pressures (side pressures) of the drive pulley and the driven pulley of the continuously variable transmission. The drive pulley includes two cylinder chambers for generating a belt pinching pressure, and the driven pulley includes one cylinder chamber for generating a belt pinching pressure. Therefore, in a state where oil pressures to be supplied to the cylinder chambers of the pulleys are equal to each other, an axial thrust for generating the belt pinching pressure in the drive pulley becomes twice as large as an axial thrust for generating the belt pinching pressure in the driven pulley, and a transmission ratio is reduced (changed in a direction toward a higher-speed transmission ratio).

PRIOR ART DOCUMENT

Patent Document

Patent Document 1: Japanese Patent Laid-Open Publication No. 2011-196390

SUMMARY OF THE INVENTION

Problems to be Solved by the Invention

In the above-described conventional oil pressure control device, an oil pressure pump for generating a hydraulic oil pressure to be supplied to the drive pulley and the driven pulley, is driven by an internal combustion engine as a drive source of a vehicle. Therefore, at the start of the engine, the pressure of the hydraulic oil rises from "0" as the rotational speed of the engine increases. At this time, when the hydraulic oil pressures to be supplied to the two pulleys increase substantially similarly, that is, when the hydraulic oil pressures to be supplied to the two pulleys are substantially equal to each other, the transmission ratio tends to be changed in the direction toward the higher-speed transmission ratio since the axial thrust in the drive pulley is twice as large as the axial thrust in the driven pulley.

For this reason, there is a problem in the conventional oil pressure control device that the driving force for starting the vehicle is insufficient upon starting the vehicle immediately after engine start. Further, if the lengths of respective oil passages from the oil pressure pump to the two pulleys are different, and the length of the oil passage to the drive pulley is shorter, the belt pinching pressure of the drive pulley rises earlier, which makes the above-described problem more conspicuous.

The present invention was made contemplating the above-described point, and an objective thereof is to provide a control apparatus for an automatic transmission mechanism, which generates a hydraulic oil pressure using an oil pressure pump driven by a drive source of a vehicle, and supplies the hydraulic oil pressure to the pulleys of a continuously variable transmission, the control apparatus being capable of properly controlling the hydraulic oil pressures supplied to two pulleys when starting the drive source, thereby ensuring a sufficient vehicle driving force immediately after the start of the drive source.

Solution to the Problem

To attain the above object, the present invention provides a control apparatus for an automatic transmission mechanism including an oil pressure pump (62) that is driven by a drive source (1) for driving a vehicle, for pressurizing hydraulic oil, a transmission (4) that has a drive pulley (25), a driven pulley (27), and a belt (28) wound around the drive pulley and the driven pulley, first oil pressure-supplying means for regulating an oil pressure generated by the oil pressure pump (62) to a first command oil pressure (PDRCMD), and supplying the oil pressure to a cylinder chamber (25c) of the drive pulley via a first oil passage (72, 72a, 73), and second oil pressure-supplying means for regulating the oil pressure generated by the oil pressure pump (62) to a second command oil pressure (PDNCMD), and supplying the oil pressure to a cylinder chamber (27c) of the driven pulley via a second oil passage (72, 72b, 74). The control apparatus is characterized by comprising drive source start-detecting means for detecting beginning of a start of the drive source (1), driven oil pressure-detecting means for detecting an oil pressure (PDN) supplied to the driven pulley (27), first command oil pressure-setting means for setting the first command oil pressure (PDRCMD) to a first predetermined oil pressure (P1) substantially equal to 0 when the beginning of the start of the drive source (1) has been detected, second command oil pressure-setting means for setting the second command oil pressure (PDNCMD) to a second predetermined oil pressure (P2) higher than the first predetermined oil pressure (P1) when the beginning of the start of the drive source (1) has been detected, and filling completion-determining means for determining completion of filling of the cylinder chamber (27c) of the driven pulley with the hydraulic oil, when the oil pressure (PDN) detected by the driven oil pressure-detecting means has reached a predetermined threshold value (PDNTH). The first command oil pressure-setting means increases the first command oil pressure (PDRCMD) after a time point (t2) when the completion of the filling of the cylinder chamber of the driven pulley has been determined.

According to this configuration, the oil pressure generated by the oil pressure pump is regulated to the first command oil pressure, and is supplied to the cylinder chamber of the drive pulley via the first oil passage. Further, the oil pressure generated by the oil pressure pump is regulated to the second command oil pressure, and is supplied to the cylinder chamber of the driven pulley via the second oil passage. When the beginning of the start of the drive source of the vehicle has been detected, the first command oil pressure is set to the first predetermined oil pressure substantially equal to 0, and the second command oil pressure is set to the second predetermined oil pressure higher than the first predetermined oil pressure. When the oil pressure supplied to the driven pulley has reached the second predetermined oil pressure, completion of the filling of the cylinder chamber of the driven pulley with the hydraulic oil has been determined. When the completion of the filling of the cylinder chamber of the driven pulley with the hydraulic oil has been determined, the control for increasing the first command oil pressure is started. Therefore, the oil pressure supplied to the cylinder chamber of the drive pulley starts to rise after the oil pressure within the cylinder chamber of the driven pulley has been ensured. This positively prevents the transmission ratio of the transmission from being changed in the direction toward a higher-speed transmission ratio, thereby making it possible to ensure a driving force required to start the vehicle immediately after the start of the engine.

Further, it is desirable that the first command oil pressure-setting means progressively increases the first command oil pressure (PDRCMD) after the time point (t2) when the completion of the filling of the cylinder chamber of the driven pulley has been determined.

According to this configuration, the first command oil pressure is set such that it is progressively increased after the completion of the filling of the cylinder chamber of the driven pulley has been determined. If the first command oil pressure is rapidly increased, there is a possibility that the oil pressure supplied to the driven pulley may be lowered. By progressively increasing the first command oil pressure to thereby progressively increase the oil pressure supplied to the drive pulley, it is possible to prevent occurrence of such an inconvenience.

It is desirable that the control apparatus further comprises oil temperature-detecting means (53) for detecting a temperature of the hydraulic oil (TOIL), and increasing speed-setting means for setting an increasing speed (DPADD) of the first command oil pressure to a smaller value as the detected temperature (TOIL) of the hydraulic oil becomes lower, and the first command oil pressure-setting means progressively increases the first command oil pressure at the set increasing speed (DPADD).

According to this configuration, the increasing speed of the first command oil pressure is set to a smaller value as the detected temperature of the hydraulic oil becomes lower, and the control of progressively increasing the first command oil pressure is performed at the set increasing speed. The degree of influence of the increase in the oil pressure supplied to the drive pulley on the oil pressure supplied to the driven pulley tends to be larger as the temperature of the hydraulic oil becomes lower. Therefore, by setting the increasing speed to a smaller value as the temperature of the hydraulic oil becomes lower, it is possible to positively prevent reduction of the oil pressure supplied to the driven pulley.

Further, in a case where a length of the first oil passage (72, 72a, 73) is shorter than a length of the second oil passage (72, 72b, 74), the oil pressure supplied to the drive pulley, at the start of the drive source, rises earlier than the oil pressure supplied to the driven pulley. This makes more noticeable the advantageous effect of the present invention that a change of the transmission ratio of the transmission in the direction toward the higher-speed transmission ratio is positively prevented.

Further, in a case where a thrust applied to the drive pulley (25) is larger than a thrust applied to the driven pulley (27) at the start of the drive source when the oil pressure (PDR) supplied by the first oil pressure-supplying means is equal to the oil pressure (PDN) supplied by the second oil pressure-supplying means, the speed at which the thrust applied to the drive pulley is increased becomes larger than the speed at which the thrust applied to the driven pulley is increased. Therefore, the advantageous effect of the present invention that a change of the transmission ratio of the transmission in the direction toward the higher-speed transmission ratio is positively prevented is made more noticeable.

MODE FOR CARRYING OUT THE INVENTION

Preferred embodiments of the present invention will now be described with reference to the drawings.

Figure 1:
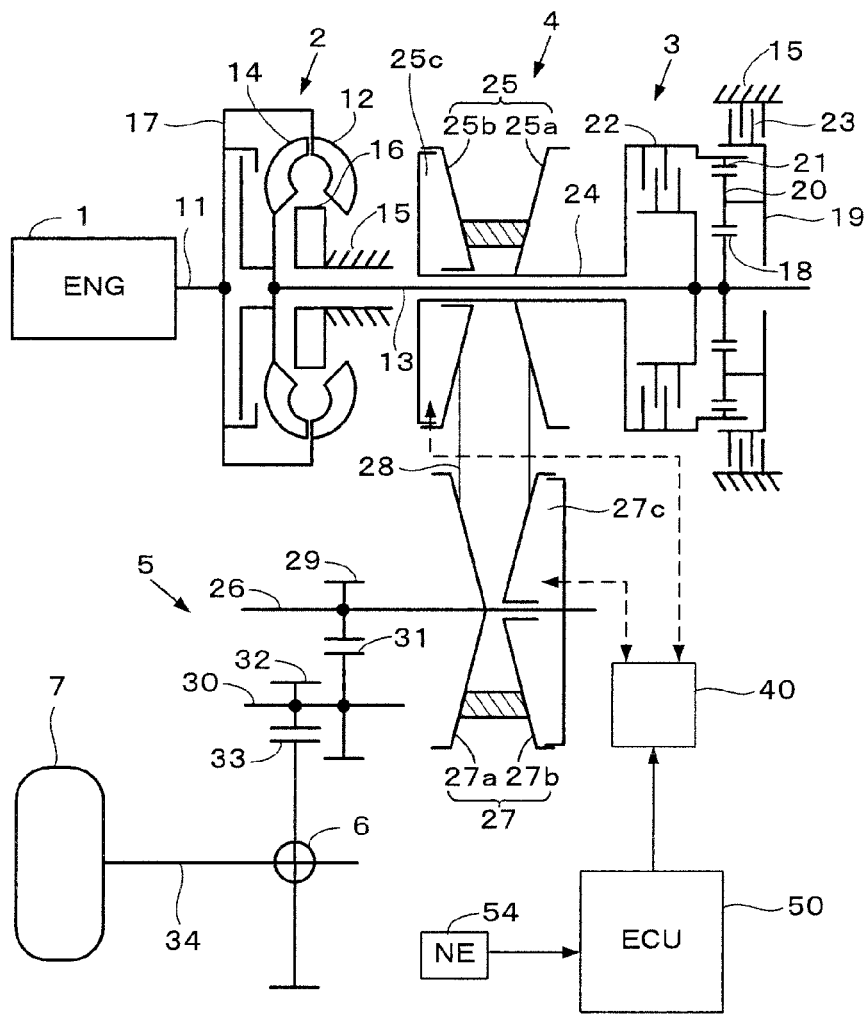
[FIG. 1] A diagram of a vehicle drive system including an automatic transmission mechanism according to an embodiment of the present invention.

FIG. 1 shows a vehicle drive system including an automatic transmission mechanism according to an embodiment of the present invention. As shown in FIG. 1, the driving force of an internal combustion engine (hereinafter simply referred to as the "engine") 1 is transmitted to drive wheels 7 via a torque converter 2, a forward/backward travel switching mechanism 3, a belt-type continuously variable transmission (hereinafter referred to as the "CVT") 4, a reduction gear train 5, and a differential gear 6.

The torque converter 2 comprises a pump 12 connected to a crankshaft 11 of the engine 1, a turbine 14 connected to an input shaft 13, a stator 16 fixed to a casing 15, and a lockup clutch 17 for directly connecting the crankshaft 11 to the input shaft 13. During disengagement of the lockup clutch 17, the torque converter 2 reduces the rotational speed of the crankshaft 11 and at the same time amplifies the torque of the crankshaft 11 to thereby transmit the torque of the crankshaft 11 to the input shaft 13.

The forward/backward travel switching mechanism 3 uses a planetary gear mechanism, and comprises a sun gear 18 fixed to the input shaft 13, a plurality of pinions 20 which are supported by a planetary carrier 19 and in mesh with the sun gear 18, and a ring gear 21 in mesh with the pinions 20. The ring gear 21 is configured such that it is connectable to the input shaft 13 via a forward clutch 22, and the planetary carrier 19 is configured such that it is connectable to the casing 15 via a reverse brake 23.

When the forward clutch 22 is engaged, the input shaft 13 is directly connected to a pulley drive shaft 24 integrally formed with the ring gear 21, whereby the pulley drive shaft 24 rotates at the same speed and in the same direction as the input shaft 13. When the reverse brake 23 is engaged, the planetary carrier 19 is held by the casing 15, whereby the pulley drive shaft 24 has its rotational speed reduced with respect to the rotational speed of the input shaft 13, and rotates in a direction opposite to the direction of rotation of the input shaft 13.

The CVT 4 comprises a drive pulley 25 supported on the pulley drive shaft 24, a driven pulley 27 supported on an output shaft 26, and a metal belt 28 wound around the drive pulley 25 and the driven pulley 27. The drive pulley 25 includes a fixed-side pulley half body 25a fixed to the pulley drive shaft 24, a movable-side pulley half body 25b axially slidably and at the same time relatively unrotatably supported on the pulley drive shaft 24, and two cylinder chambers 25c. The movable-side pulley half body 25b is urged toward the fixed-side pulley half body 25a by oil pressure supplied to the cylinder chambers 25c. The driven pulley 27 includes a fixed-side pulley half body 27a fixed to the output shaft 26, a movable-side pulley half body 27b axially slidably and at the same time relatively unrotatably supported on the output shaft 26, and a cylinder chamber 27c. The movable-side pulley half body 27b is urged toward the fixed-side pulley half body 27a by the oil pressure supplied to the cylinder chamber 27c.

A first control oil pressure PDR is caused to act on the cylinder chambers 25c of the drive pulley 25, while a second control oil pressure PDN is caused to act on the cylinder chamber 27c of the driven pulley 27. By decreasing the first control oil pressure PDR, the movable-side pulley half body 25b of the drive pulley 25 is moved away from the fixed-side pulley half body 25a to decrease the effective diameter of the pulley, whereas by increasing the second control oil pressure PDN, the movable-side pulley half body 27b of the driven pulley 27 is moved closer to the fixed-side pulley half body 27a to increase the effective diameter of the pulley. As a consequence, a transmission ratio RATIO of the CVT 4 is increased (changed in a direction toward a lower-speed transmission ratio). It is to be noted that even when only one of the increase in the first control oil pressure PDR and the decrease in the second control oil pressure PDN is performed, the transmission ratio RATIO is similarly changed.

Inversely, when the first control oil pressure PDR is increased and the second control oil pressure PDN is decreased, the movable-side pulley half body 25b of the drive pulley 25 is moved closer to the fixed-side pulley half body 25a to increase the effective diameter of the pulley, and at the same time the movable-side pulley half body 27b of the driven pulley 27 is moved away from the fixed-side pulley half body 27a to decrease the effective diameter of the pulley. As a consequence, the transmission ratio RATIO is decreased (changed in a direction toward a higher-speed transmission ratio). It is to be noted that even when only one of the decrease in the first control oil pressure PDR and the increase in the second control oil pressure PDN is performed, the transmission ratio RATIO is similarly changed.

A first reduction gear 29 provided on the output shaft 26 is in mesh with a second reduction gear 31 provided on a reduction shaft 30, and a final drive gear 32 provided on the reduction shaft 30 is in mesh with a final driven gear 33 of the differential gear 6. The drive wheels 7 are connected to left and right axles 34 extending from the differential gear 6.

The first and second control oil pressures PDR and PDN supplied to the respective cylinder chambers 25c and 27c of the CVT 4 are controlled by an electronic control unit (hereinafter referred to as the "ECU") 50 via an oil pressure control device 40. A detection signal is delivered to the ECU 50 from an engine speed sensor 54 which detects a rotational speed NE of the engine 1. Further, detection signals are delivered to the ECU 50 from other various sensors (not shown). The ECU 50 controls the first and second control oil pressures PDR and PDN according to the detected vehicle traveling speed VP, operation amount AP of an accelerator pedal, engine rotational speed NE, etc.

Figure 2:
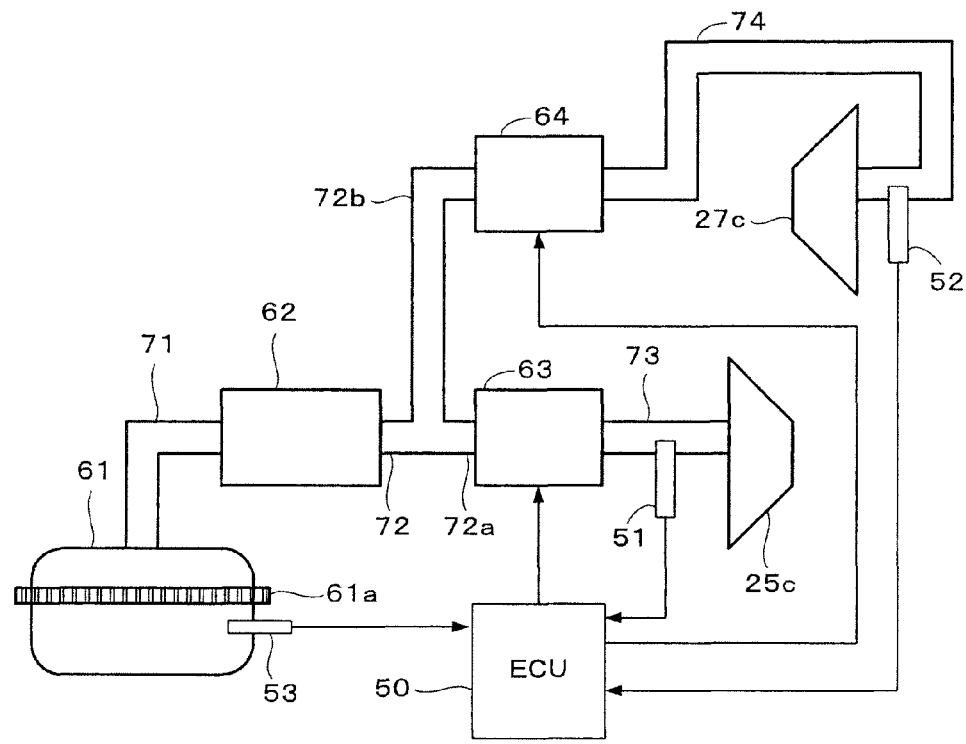
[FIG. 2] A diagram of an oil pressure control device appearing in FIG. 1.

As shown in FIG. 2, the oil pressure control device 40 comprises a reservoir 61 which has a strainer 61a and stores hydraulic oil, an oil pressure pump 62 which pumps hydraulic oil from the reservoir 61 and pressurizes the hydraulic oil, a first regulating valve unit 63 which regulates the first control oil pressure PDR supplied to the cylinder chambers 25c of the drive pulley 25, a second regulating valve unit 64 which regulates the second control oil pressure PDN supplied to the cylinder chamber 27c of the driven pulley 27, an oil passage 71 which connects between the reservoir 61 and the oil pressure pump 62, an oil passage 72 which connects between the oil pressure pump 62 and the first and second regulating valve units 63 and 64, an oil passage 73 which connects between the first regulating valve unit 63 and the cylinder chambers 25c, and an oil passage 74 which connects between the second regulating valve unit 64 and the cylinder chamber 27c. In the present embodiment, the length of a path from the oil pressure pump 62 to the cylinder chamber 27c, that is, the total length of the oil passage 72 and an oil passage 72b, and the oil passage 74 is approximately twice as long as the length of a path from the oil pressure pump 62 to the cylinder chambers 25c, that is, the total length of the oil passage 72, an oil passage 72a, and the oil passage 73.

The oil pressure pump 62 is a variable displacement pump that is driven by the engine 1, and can switch operation thereof between a full capacity operation in which a discharge flow rate is maximized and a half capacity operation in which the discharge flow rate is reduced to half the full capacity operation. The oil passage 72 branches into the oil passages 72a and 72b, which are connected to the first and second regulating valve units 63 and 64, respectively. The first regulating valve unit 63 includes a linear solenoid valve and a regulating valve, and regulates oil pressure according to a control signal from the ECU 50 such that the first control oil pressure PDR becomes equal to a first command oil pressure PDRCMD. The second regulating valve unit 64 is configured similarly to the first regulating valve unit 63, and regulates oil pressure according to a control signal from the ECU 50 such that the second control oil pressure PDN becomes equal to a second command oil pressure PDNCMD.

The oil passages 73 and 74 are provided with a first oil pressure sensor 51 for detecting the first control oil pressure PDR, and a second oil pressure sensor 52 for detecting the second control oil pressure PDN, respectively. Further, the reservoir 61 is provided with an oil temperature sensor 53 for detecting a hydraulic oil temperature TOIL. Detection signals from the sensors 51 to 53 are delivered to the ECU 50.

It is to be noted a more specific configuration of the oil pressure control device 40 is disclosed e.g. in Patent Document 1 mentioned hereinbefore.

Figure 3:
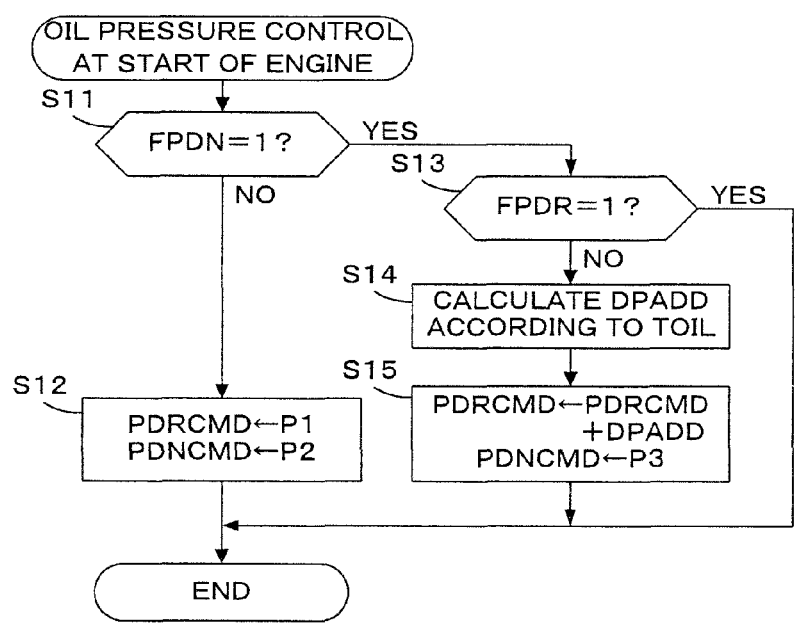
[FIG. 3] A flowchart of a process for performing oil pressure control.

FIG. 3 is a flowchart of part of a process for controlling the first and second control oil pressures PDR and PDN, and shows the process at the start of the engine 1. This process is executed by the ECU 50 whenever a predetermined time period elapses, and start to be executed when beginning of the start of the engine 1 is detected. In the present embodiment, when the engine rotational speed NE has exceeded a start determination engine rotational speed NEST (e.g. 100 rpm), it is determined that the start of the engine 1 has begun.

In a step S11, it is determined whether or not a second control oil pressure-ensuring flag FPDN is equal to "1". The second control oil pressure-ensuring flag FPDN is set to "1" when a detected second control oil pressure PDN first reaches a first predetermined threshold value PDNTH, and is held at "1" during operation of the engine 1. When the second control oil pressure PDN has reached the first predetermined threshold value PDNTH, it is determined that filling of the cylinder chamber 27c of the driven pulley 27 with the hydraulic oil has been completed.

The answer to the step S11 is negative (NO) immediately after beginning of the start of the engine 1. Then, the process proceeds to a step S12, wherein the first command oil pressure PDRCMD, which is a command oil pressure of the first control oil pressure PDR, is set to a first predetermined oil pressure P1, and the second command oil pressure PDNCMD, which is a command oil pressure of the second control oil pressure PDN, is set to a second predetermined oil pressure P2. The first predetermined oil pressure P1 is an oil pressure which generates no side pressure (belt pinching pressure) of the drive pulley 25, and is set to "0" or a value slightly larger than "0". The second predetermined oil pressure P2 is set to a value for promoting filling of the cylinder chamber 27c of the driven pulley 27 with the hydraulic oil. Further, in the present embodiment, the first predetermined threshold value PDNTH used in the step S11 is set to the second predetermined oil pressure P2.

When the second control oil pressure PDN rises high enough to make the answer to the step S11 affirmative (YES), i.e., the filling of the cylinder chamber 27c has been completed, the process proceeds to a step S13, in which it is determined whether or not a first control oil pressure-ensuring flag FPDR is equal to "1". The first control oil pressure-ensuring flag FPDR is set to "1" when a detected first control oil pressure PDR first reaches a second predetermined threshold value PDRTH after the beginning of the start of the engine, and is held at "1" during operation of the engine 1. The second predetermined threshold value PDRTH is set to a value approximately the same as the first predetermined threshold value PDNTH, for example.

Figure 4:
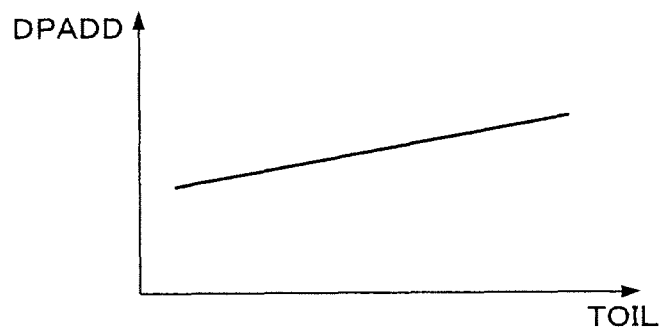
[FIG. 4] A diagram of a table referred to in the process of FIG. 3.

The answer to the step S13 first becomes negative (NO), and the process proceeds to a step S14, in which an addend term DPADD is calculated by retrieving a DPADD table shown in FIG. 4 according to the hydraulic oil temperature TOIL. The DPADD table is configured such that the addend term DPADD becomes smaller as the hydraulic oil temperature TOIL becomes lower.

In a step S15, the first command oil pressure PDRCMD is updated by the following equation (1), and the second command oil pressure PDNCMD is set to a third predetermined oil pressure P3. In the equation (1), PDRCMD on the right side is the immediately preceding value of the first command oil pressure PDRCMD. By using the equation (1), the first command oil pressure PDRCMD is controlled such that it is progressively increased at an increasing rate corresponding to the addend term DPADD.

$$PDRCMD=PDRCMD+DPADD \tag{1}$$

The third predetermined oil pressure P3 is set to a value which makes it possible to hold the transmission ratio RATIO at the low-speed transmission ratio, even when the control for raising the first control oil pressure PDR is started. In the present embodiment, the third predetermined oil pressure P3 is set to the same value as that of the second predetermined oil pressure P2.

When the first control oil pressure PDR rises high enough to make the answer to the step S13 affirmative (YES), the process shifts to a normal control process (not shown).

Figure 5:
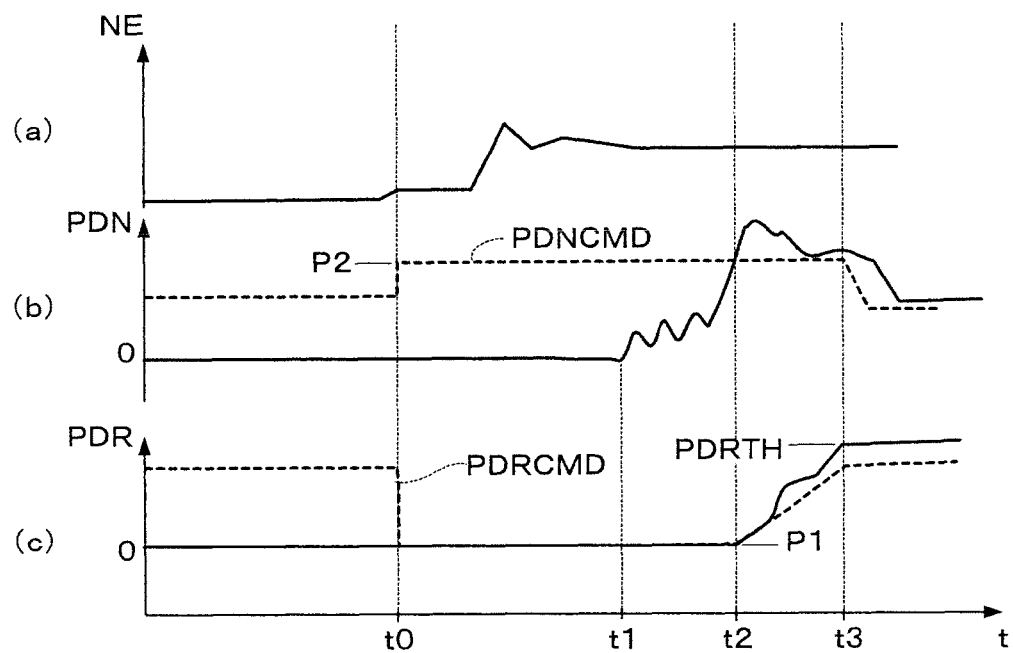
[FIG. 5] A timing chart for explaining the process of FIG. 3.

FIG. 5 is a timing chart useful in explaining the process in FIG. 3, in which (a) to (c) of FIG. 5 show changes in the engine rotational speed NE, the first control oil pressure PDR, and the second control oil pressure PDN, respectively. In (b) and (c) of FIG. 5, changes in the first command oil pressure PDRCMD and the second command oil pressure PDNCMD are indicated by respective broken lines.

When the start of the engine 1 has begun at a time t0, the first command oil pressure PDRCMD is set to the first predetermined oil pressure P1 ($\approx$0), and the second command oil pressure PDNCMD is set to the second predetermined oil pressure P2 (step S12). It is to be noted during a time period before the time t0, the first and second command oil pressures PDRCMD and PDNCMD are set to values larger than "0" in order to prevent the regulating valve units 63 and 64 from generating noise.

By setting the second command oil pressure PDNCMD to the second predetermined oil pressure P2, the second control oil pressure PDN starts to rise at a time t1, and reaches the first predetermined threshold value PDNTH (=P2) at a time t2. Accordingly, the control for progressively increasing the first command oil pressure PDRCMD using the equation (1) is started. At this time, the second command oil pressure PDNCMD is set to the third predetermined oil pressure P3 (=P2).

The first control oil pressure PDR reaches the second predetermined threshold value PDRTH at a time t3, and the first control oil pressure-ensuring flag FPDR is set to 1, whereby the process shifts to the normal control process (step S13).

Figure 6:
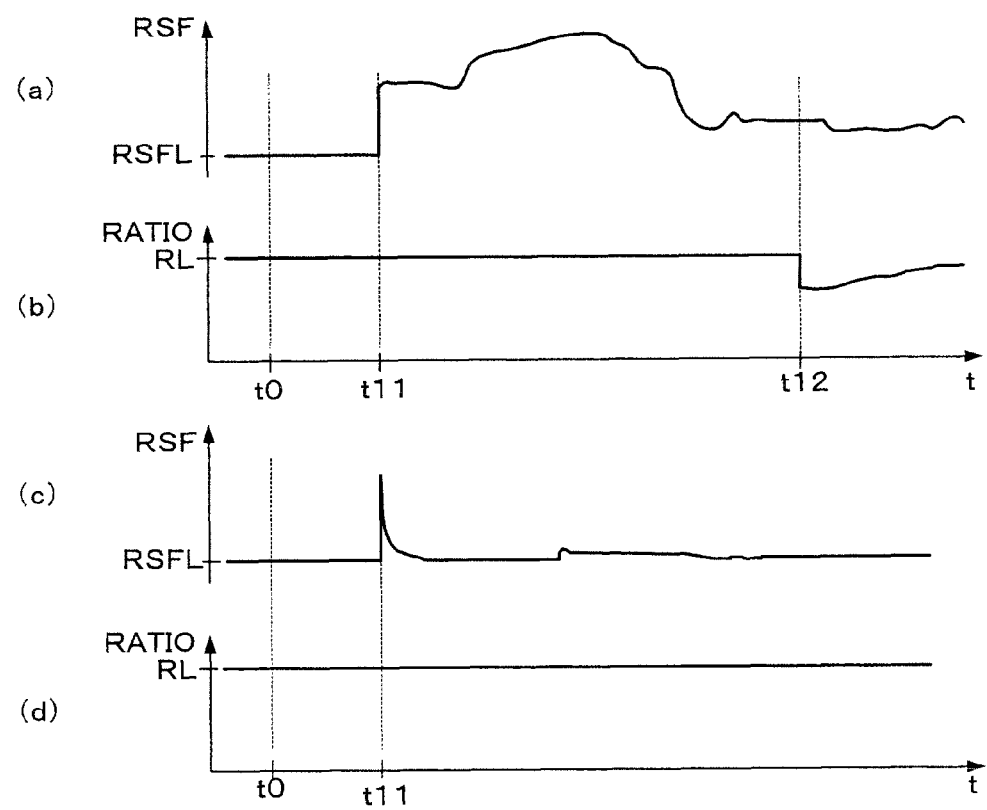
[FIG. 6] A timing chart for explaining advantageous effects provided by the present invention.

FIG. 6 is a timing chart useful in explaining advantageous effects provided by executing the oil pressure control shown in FIG. 3 immediately after the start of the engine 1. Part of (a) and (b) of FIG. 6 corresponds to a case where a conventional control method (method of setting the first and second command oil pressure PDRCMD and PDNCMD to approximately the same value at the start beginning time t0) is applied. Part of (c) and (d) FIG. 6 corresponds to a case where the oil pressure control shown in FIG. 3 is applied. Further, (a) and (c) of FIG. 6 show changes in an axial thrust ratio RSF, and (b) and (d) of FIG. 6 show changes in the transmission ratio RATIO. The axial thrust ratio RSF is a parameter indicative of a ratio between an axial thrust FDR of the drive pulley 25 and an axial thrust FDN of the driven pulley 27, and is defined such that RSF increases as the axial thrust FDR of the drive pulley 25 becomes relatively large. In the figures showing the changes in the transmission ratio RATIO, RL represents a starting transmission ratio suitable for starting the vehicle.

In the conventional method, at the start beginning time t0, the axial thrust ratio RSF takes a value RSFL suitable for holding the transmission ratio RATIO at the starting transmission ratio RL, but RSF rapidly increases at a time t11, and after that, the state where it takes large values continues until the transmission ratio RATIO rapidly decreases at a time t12.

On the other hand, when the oil pressure control shown in FIG. 3 is applied, the axial thrust ratio RSF increases for a very short time period at the time t11, and then it is held at the value RSFL. Accordingly, the transmission ratio RATIO is held at the starting transmission ratio RL, whereby it is possible to obtain a sufficient driving force to start the vehicle immediately after the start of the engine 1.

As described heretofore, in the present embodiment, the oil pressure generated by the oil pressure pump 62 is regulated to the first command oil pressure PDRCMD, and is supplied to the cylinder chambers 25c of the drive pulley 25 via the oil passages 72, 72a, and 73. Further, the oil pressure generated by the oil pressure pump 62 is regulated to the second command oil pressure PDNCMD, and is supplied to the cylinder chamber 27c of the driven pulley 27 via the oil passages 72, 72b, and 74. When the beginning of the start of the engine 1 is detected, the first command oil pressure PDRCMD is set to the first predetermined oil pressure P1 substantially equal to 0, and the second command oil pressure PDNCMD is set to the second predetermined oil pressure P2 which is higher than the first predetermined oil pressure P1, and promotes filling of the cylinder chamber 27c with the hydraulic oil. After that, when the detected second control oil pressure PDN (oil pressure supplied to the driven pulley 27) has reached the first predetermined threshold value PDNTH, it is determined that the filling of the cylinder chamber 27c of the driven pulley 27 with the hydraulic oil has been completed (the second control oil pressure-ensuring flag FPDN is set to 1). At the time t2 at which it is determined that the filling of the cylinder chamber 27c has been completed, the control for increasing the first command oil pressure PDRCMD is started. Therefore, the first control oil pressure PDR supplied to the cylinder chambers 25c of the drive pulley 25 starts to rise after the oil pressure within the cylinder chamber 27c of the driven pulley 27 has been ensured. This positively prevents the transmission ratio RATIO from being decreased (changed in the direction toward the higher-speed transmission ratio), thereby making it possible to ensure a driving force required to start the vehicle immediately after the start of the engine 1.

Further, the first command oil pressure PDRCMD is set such that it is progressively increased after the time t2 at which it is determined that the filling of the cylinder chamber 27c of the driven pulley 27 has been completed. Although if the first command oil pressure PDRCMD is rapidly increased, there is a possibility that the second control oil pressure PDN supplied to the driven pulley 27 is lowered, it is possible to prevent occurrence of such an inconvenience, by progressively increasing the first command oil pressure PDRCMD to progressively increase the first control oil pressure PDR supplied to the drive pulley 25.

Further, the addend term DPADD that determines a speed at which the first command oil pressure PDRCMD is increased is set to a smaller value as the detected hydraulic oil temperature TOIL becomes lower, and by adding the set addend term DPADD to the immediately preceding value of PDRCMD, the control for progressively increasing the first command oil pressure PDRCMD is performed. The degree of influence of the increase in the first control oil pressure PDR supplied to the drive pulley 25 on the second control oil pressure PDN tends to become larger as the hydraulic oil temperature TOIL becomes lower. Therefore, by setting the addend term DPADD to a smaller value to thereby set the increasing speed of the first command oil pressure PDRCMD to a smaller value as the detected hydraulic oil temperature TOIL becomes lower, it is possible to positively prevent reduction in the second control oil pressure PDN when the temperature of the hydraulic oil is low.

Further, the length of the path from the oil pressure pump 62 to the cylinder chambers 25c, that is, the total length of the oil passages 72, 72a, and 73 is shorter than the length of the path from the oil pressure pump 62 to the cylinder chamber 27c, that is, the total length of the oil passages 72, 72b, and 74, and hence the first control oil pressure PDR supplied to the drive pulley 25 at the start of the engine rises earlier than the second control oil pressure PDN supplied to the driven pulley 27. Therefore, by applying the control method of the present embodiment, it is possible to obtain a more noticeable effect for preventing reduction of the transmission ratio RATIO.

Further, when the first control oil pressure PDR and the second control oil pressure PDN are equal to each other, the thrust applied to the drive pulley 25 is larger than the thrust applied to the driven pulley 27, so that at the start of the engine, a speed at which the thrust applied to the drive pulley 25 is increased becomes larger than a speed at which the thrust applied to the driven pulley 27 is increased. Therefore, by applying the control method of the present embodiment, it is possible to obtain a more noticeable effect for preventing reduction of the transmission ratio RATIO.

In the present embodiment, the engine 1 corresponds to the drive source, the second oil pressure sensor 52 corresponds to the driven oil pressure-detecting means, and the oil temperature sensor 53 corresponds to the oil temperature-detecting means. Further, the oil passages 72, 72a, and 73, and the first regulating valve unit 63 constitute the first oil pressure-supplying means, and the oil passages 72, 72b, and 74, and the second regulating valve unit 64 constitute the second oil pressure-supplying means. The engine speed sensor 54 constitutes a part of the drive source start-detecting means. Further, the ECU 50 constitutes a part of the drive source start-detecting means, the first command oil pressure-setting means, the second command oil pressure-setting means, and the filling completion-determining means. Specifically, the step S11 in FIG. 3 corresponds to the filling completion-determining means, and the steps S12 to S15 correspond to the first command oil pressure-setting means and the second command oil pressure-setting means.

It is to be noted the present invention is by no means limited to the embodiment described above, but can be practiced in various embodiments. For example, the drive source of the vehicle is not limited to the engine, but an electric motor or a combination of the electric motor and the engine may be employed as the drive source of the vehicle.

Further, although the embodiment described above shows an example where the length of the path from the oil pressure pump 62 to the cylinder chambers 25c of the drive pulley is shorter than the length of the path from the oil pressure pump 62 to the cylinder chamber 27c of the driven pulley, the present invention can be applied without being limited to such an example of the arrangement.

Furthermore, in the above-described embodiment, the oil pressure pump 62 is a variable displacement pump. Alternatively, a fixed displacement pump may be used.

DESCRIPTION OF REFERENCE NUMERALS

1 Internal combustion engine (drive source)
4 Continuously variable transmission
50 Electronic control unit (drive source start-detecting means, first command oil pressure-setting means, second command oil pressure-setting means, filling completion-determination means)
51 First oil pressure sensor
52 Second oil pressure sensor (driven oil pressure-detecting means)
53 Oil temperature sensor (oil temperature-detecting means)
54 Engine speed sensor
62 Oil pressure pump
63 First regulating valve unit (first oil pressure-supplying means)
64 Second regulating valve unit (second oil pressure-supplying means)
72 (72a, 72b), 73, 74 Oil passage (first oil pressure-supplying means, second oil pressure-supplying means)

The invention claimed is:
1. A control apparatus for an automatic transmission mechanism including:
an oil pressure pump, that is driven by a drive source for driving a vehicle, for pressurizing hydraulic oil;
a transmission that has a drive pulley, a driven pulley, and a belt wound around the drive pulley and the driven pulley;
first oil pressure-supplying means for regulating an oil pressure generated by the oil pressure pump to a first command oil pressure, and supplying the oil pressure to a cylinder chamber of the drive pulley via a first oil passage; and
second oil pressure-supplying means for regulating the oil pressure generated by the oil pressure pump to a second command oil pressure, and supplying the oil pressure to a cylinder chamber of the driven pulley via a second oil passage,
the control apparatus being characterized by comprising:
drive source start-detecting means for detecting beginning of a start of the drive source;

driven oil pressure-detecting means for detecting an oil pressure supplied to the driven pulley;

first command oil pressure-setting means for setting the first command oil pressure to a first predetermined oil pressure substantially equal to 0 when the beginning of the start of the drive source has been detected;

second command oil pressure-setting means for setting the second command oil pressure to a second predetermined oil pressure higher than the first predetermined oil pressure when the beginning of the start of the drive source has been detected; and filling completion-determining means for determining completion of filling of the cylinder chamber of the driven pulley with the hydraulic oil, when the oil pressure detected by said driven oil pressure-detecting means has reached a predetermined threshold value, wherein said first command oil pressure-setting means increases the first command oil pressure after a time point when the completion of the filling of the cylinder chamber of the driven pulley has been determined.

2. The control apparatus as claimed in claim 1, wherein said first command oil pressure-setting means progressively increases the first command oil pressure after the time point when the completion of the filling of the cylinder chamber of the driven pulley has been determined.

3. The control apparatus as claimed in claim 2, further comprising:

oil temperature-detecting means for detecting a temperature of the hydraulic oil; and increasing speed-setting means for setting an increasing speed of the first command oil pressure to a smaller value as the detected temperature of the hydraulic oil becomes lower, wherein said first command oil pressure-setting means progressively increases the first command oil pressure at the set increasing speed.

4. The control apparatus as claimed in claim 3, wherein a length of the first oil passage is shorter than a length of the second oil passage.

5. The control apparatus as claimed in claim 4, wherein a thrust applied to the drive pulley is larger than a thrust applied to the driven pulley when the oil pressure supplied by said first oil pressure-supplying means is equal to the oil pressure supplied by said second oil pressure-supplying means.

6. The control apparatus as claimed in claim 3, wherein a thrust applied to the drive pulley is larger than a thrust applied to the driven pulley when the oil pressure supplied by said first oil pressure-supplying means is equal to the oil pressure supplied by said second oil pressure-supplying means.

7. The control apparatus as claimed in claim 2, wherein a length of the first oil passage is shorter than a length of the second oil passage.

8. The control apparatus as claimed in claim 7, wherein a thrust applied to the drive pulley is larger than a thrust applied to the driven pulley when the oil pressure supplied by said first oil pressure-supplying means is equal to the oil pressure supplied by said second oil pressure-supplying means.

9. The control apparatus as claimed in claim 2, wherein a thrust applied to the drive pulley is larger than a thrust applied to the driven pulley when the oil pressure supplied by said first oil pressure-supplying means is equal to the oil pressure supplied by said second oil pressure-supplying means.

10. The control apparatus as claimed in claim 1, wherein a length of the first oil passage is shorter than a length of the second oil passage.

11. The control apparatus as claimed in claim 10, wherein a thrust applied to the drive pulley is larger than a thrust applied to the driven pulley when the oil pressure supplied by said first oil pressure-supplying means is equal to the oil pressure supplied by said second oil pressure-supplying means.

12. The control apparatus as claimed in claim 1, wherein a thrust applied to the drive pulley is larger than a thrust applied to the driven pulley when the oil pressure supplied by said first oil pressure-supplying means is equal to the oil pressure supplied by said second oil pressure-supplying means.

* * * * *